US010745127B2

(12) United States Patent
Stabler et al.

(10) Patent No.: US 10,745,127 B2
(45) Date of Patent: *Aug. 18, 2020

(54) SYSTEMS AND METHODS FOR EXECUTION OF RECOVERY ACTIONS ON AN UNMANNED AERIAL VEHICLE

(71) Applicant: Kespry Inc., Menlo Park, CA (US)

(72) Inventors: Benjamin Stuart Stabler, Menlo Park, CA (US); Robert Parker Clark, Palo Alto, CA (US); Nathaniel Hall-Snyder, Palo Alto, CA (US); Paul Doersch, Carmichael, CA (US)

(73) Assignee: Kespry Inc., Menlo Park, CA (US)

( * ) Notice: Subject to any disclaimer, the term of this patent is extended or adjusted under 35 U.S.C. 154(b) by 214 days.

This patent is subject to a terminal disclaimer.

(21) Appl. No.: 15/949,857

(22) Filed: Apr. 10, 2018

(65) Prior Publication Data

US 2018/0229842 A1   Aug. 16, 2018

Related U.S. Application Data

(63) Continuation of application No. 14/693,734, filed on Apr. 22, 2015, now Pat. No. 9,938,008, which is a (Continued)

(51) Int. Cl.
*B64C 39/02* (2006.01)
*G05D 1/00* (2006.01)
*G05B 23/02* (2006.01)

(52) U.S. Cl.
CPC ........ *B64C 39/024* (2013.01); *G05B 23/0286* (2013.01); *G05D 1/0088* (2013.01); *B64C 2201/145* (2013.01)

(58) Field of Classification Search
CPC . B64C 39/02; B64C 39/024; B64C 2201/145; G05D 1/00; G05D 1/0088
(Continued)

(56) References Cited

U.S. PATENT DOCUMENTS 5,550,736 A   8/1996  Hay et al.
6,122,572 A *  9/2000  Yavnai ................. G05D 1/0088
                                                    342/13

(Continued)

FOREIGN PATENT DOCUMENTS

WO   2001073516 A1   10/2001

OTHER PUBLICATIONS

Communication Relating to the Results of the Partial International Search, Annex to the Invitation to Pay Additional Fees in International Application No. PCT/US2016/028498 dated Jul. 15, 2016.
(Continued)

*Primary Examiner* — Krishnan Ramesh
(74) *Attorney, Agent, or Firm* — Fenwick & West LLP

(57) ABSTRACT

Provided herein are systems and methods for providing reliable control of an unmanned aerial vehicle (UAV). A system for providing reliable control of the UAV can include a computing device that can execute reliable and unreliable programs. The unreliable programs can be isolated from the reliable programs by virtue of executing one or more of the programs in a virtual machine client. The UAV can initiate a recovery action when one or more of the unreliable programs fail. The recovery action can be performed without input from one or more of the unreliable programs.

19 Claims, 5 Drawing Sheets

Related U.S. Application Data continuation-in-part of application No. PCT/US2014/061626, filed on Oct. 21, 2014.

(60) Provisional application No. 61/893,736, filed on Oct. 21, 2013.

(58) Field of Classification Search
USPC .......................................................... 701/3
See application file for complete search history.

(56) References Cited

U.S. PATENT DOCUMENTS

| | | | |
|---|---|---|---|
| 8,543,255 | B2 | 9/2013 | Wood et al. |
| 2005/0183569 | A1 | 8/2005 | Solomon |
| 2007/0021880 | A1 | 1/2007 | Appleby et al. |
| 2007/0228221 | A1 | 10/2007 | Segal |
| 2010/0282897 | A1* | 11/2010 | de la Torre ........... B64C 39/024 244/49 |
| 2011/0035149 | A1* | 2/2011 | McAndrew .......... G05D 1/0038 701/466 |
| 2011/0084162 | A1* | 4/2011 | Goossen ............... B64C 39/024 244/12.1 |
| 2011/0202203 | A1* | 8/2011 | Johansson ........... G05D 1/0022 701/2 |
| 2012/0022719 | A1 | 1/2012 | Matos |
| 2012/0072058 | A1 | 3/2012 | Regmi |
| 2013/0261853 | A1 | 10/2013 | Shue et al. |
| 2014/0139366 | A1* | 5/2014 | Moses ................ G01S 13/9303 342/27 |
| 2014/0316616 | A1* | 10/2014 | Kugelmass ............ G05D 1/101 701/8 |
| 2015/0153740 | A1 | 6/2015 | Ben-Shachar et al. |
| 2015/0203200 | A1 | 7/2015 | Bye et al. |
| 2016/0070265 | A1 | 3/2016 | Liu et al. |
| 2016/0225264 | A1 | 8/2016 | Taveira |
| 2016/0245907 | A1 | 8/2016 | Parker et al. |

OTHER PUBLICATIONS

International Search Report and Written Opinion in International Application No. PCT/US2014/061626, dated Jul. 17, 2015.

International Search Report in International Application No. PCT/US2016/028498 dated Sep. 6, 2016.

Kendoul, et al., "Embedded autopilot for accurate waypoint navigation and trajectory tracking: Application to miniature rotorcraft UAVs", 2009 IEEE International Conference on Robotics and Automation • (ICRA) ; Kobe, Japan, May 12-17, 2009, IEEE, Piscataway, NJ, USA, May 12, 2009, pp. 2884-2890.

* cited by examiner

SYSTEMS AND METHODS FOR EXECUTION OF RECOVERY ACTIONS ON AN UNMANNED AERIAL VEHICLE

CROSS-REFERENCE

This application is a continuation of U.S. patent application Ser. No. 14/693,734, filed on Apr. 22, 2015, which is a continuation-in-part of PCT/US2014/61626, filed on Oct. 21, 2014, which application claims priority to U.S. Provisional Patent Application Ser. No. 61/893,736, filed Oct. 21, 2013, all of which are entirely incorporated herein by reference.

BACKGROUND

An unmanned aerial vehicle (UAV), commonly known as a drone and in some cases referred to as a Remotely Piloted Aircraft (RPA), may be an aircraft without a human pilot aboard. There are different kinds of drones. A drone may be an unmanned air system (UAS), unmanned aerial vehicle (UAV), remote piloted aircraft systems (RPAS) and model aircraft. Its flight is controlled either autonomously by onboard computers or by the remote control of a pilot on the ground or in another vehicle. The typical launch and recovery method of an unmanned aircraft is by the function of an automatic system or an external operator on the ground. Historically, UAVs have been simple remotely piloted aircraft.

UAV's are typically deployed for military and special operation applications, but also used in a small but growing number of civil applications, such as policing and firefighting, and nonmilitary security work, such as inspection of power or pipelines.

During use, a UAV can execute one or more programs on-board the UAV to collect and interpret data. The programs can provide the collected and/or interpreted data to a flight control system to initiate a flight response.

SUMMARY

Recognized herein are various issues with unmanned aerial vehicles (UAV's) currently available. An example issue is that a UAV can receive data or instructions from an unreliable program executing on the UAV. The unreliable program can provide erroneous data that can cause the UAV to be lost, damaged, or cause damage to other entities. In some cases, the control system of a UAV may become unreliable, which may pose health and safety concerns if the UAV is operating in urban areas. In some cases, a program may be executing on the same computing device as flight code. If that program is unreliable, it may crash or hang, and this might impact the critical flight code. In some cases, the unreliable program can be executed on a separate computing device that is different from a computing device that executes reliable software.

The present disclosure provides systems and methods for providing reliable control of an unmanned aerial vehicle. Systems and methods provided herein can advantageously permit a UAV to execute reliable and unreliable software on a single computing device without increasing risk of loss of the UAV, damage of the UAV, or damage to other entities.

In an aspect of the present disclosure, a method of providing a reliable control system on-board a UAV comprises executing with one or more computer processors a first program and a second program in memory onboard the UAV, wherein upon execution, the first program collects sensor data directly from one or more sensors of the UAV; transmitting the sensor data from the first program to the second program; monitoring the sensor data transmitted from the first program to the second program to determine a level of accuracy of the sensor data transmitted from the first program to the second program with respect to the sensor data collected from the one or more sensors of the UAV; and initiating a recovery action by the UAV if the level of accuracy falls below a threshold accuracy over a given time interval.

In an embodiment, the method further comprises receiving instructions describing the recovery action of the UAV at discrete time intervals. In another embodiment, the second software program is more reliable than the first software program. In another embodiment, the recovery action includes one or more instructions to return the UAV to a given location. In another embodiment, the recovery action includes one or more instructions to land the UAV. In another embodiment, the recovery action includes one or more instructions to return the UAV to a closest or nearby safe landing area.

In an embodiment, the second program is executed on a host operating system on a computer onboard the UAV. In another embodiment, the first program is executed on a client virtual machine on the computer. In another embodiment, the second program receives and follows instructions transmitted from the first program upon execution. In another embodiment, the second program receives and disregards instructions transmitted from the first program upon execution.

In an embodiment, the method further comprises generating instructions describing the recovery action based on UAV state and location parameter(s) corresponding to the UAV in real time. In another embodiment, the UAV state parameter(s) include current charge remaining on a battery of the UAV. In another embodiment, the location parameter(s) include distance between a current location of a UAV and a starting point of the UAV. In another embodiment, the location parameter(s) include distance between a current location of a UAV and a nearest landing area of the UAV. In another embodiment, the instructions are generated by one or computer processors off-board the UAV.

In an embodiment, the one or more computer processors are onboard the UAV. In another embodiment, the one or more computer processors are remotely located with respect to the UAV.

Another aspect provides a computer readable medium comprising machine-executable code that upon execution by one or more computer processors implements any of the methods above or elsewhere herein.

In some embodiments, a computer readable medium comprises machine executable code that, upon execution by one or more computer processors, implements a method of providing a reliable control system on-board a UAV, the method comprising executing a first program and a second program in memory onboard the UAV, wherein upon execution, the first program collects sensor data directly from one or more sensors of the UAV; transmitting the sensor data from the first program to the second program; monitoring the sensor data transmitted from the first program to the second program to determine a level of accuracy of the sensor data transmitted from the first program to the second program with respect to the sensor data collected from the one or more sensors of the UAV; and initiating a recovery action by the UAV if the level of accuracy falls below a threshold accuracy over a given time interval.

Another aspect provides a system comprising one or more computer processors and memory coupled thereto. The memory comprises machine-executable code that upon execution by the one or more computer processors implements any of the methods above or elsewhere herein.

In some embodiments, a system for providing reliable control of a UAV comprises one or more sensors onboard the UAV, wherein the one or more sensors provide sensor data; memory onboard the UAV for storing the sensor data from the one or more sensors; and one or more computer processors that are programmed to (i) execute a first program and a second program in memory onboard the UAV, wherein upon execution, the first program collects the sensor data directly from the one or more sensors of the UAV, (ii) transmit the sensor data from the first program to the second program, (iii) monitor the sensor data transmitted from the first program to the second program to determine a level of accuracy of the sensor data transmitted from the first program to the second program with respect to the sensor data collected from the one or more sensors of the UAV, and (iv) initiate a recovery action by the UAV if the level of accuracy falls below a threshold accuracy over a given time interval.

In an embodiment, the one or more computer processors are programmed to receive instructions describing the recovery action of the UAV at discrete time intervals. In another embodiment, the second software program is more reliable than the first software program. In another embodiment, the recovery action includes one or more instructions in memory to return the UAV to a given location. In another embodiment, the recovery action includes one or more instructions in memory to land the UAV. In another embodiment, the recovery action includes one or more instructions to return the UAV to a closest or nearby safe landing area.

In an embodiment, the second program is executed on a host operating system on a computer onboard the UAV. In another embodiment, the one or more computer processors are programmed to execute the first program on a client virtual machine on the computer.

In an embodiment, the one or more computer processors are programmed to generate instructions describing the recovery action based on UAV state and location parameter(s) corresponding to the UAV in real time. In another embodiment, the UAV state parameter(s) is current charge remaining on a battery of the UAV. In another embodiment, the location parameter(s) include distance between a current location of a UAV and a starting point of the UAV. In another embodiment, the location parameter(s) include distance between a current location of a UAV and a nearest landing area of the UAV.

In an embodiment, the one or more computer processors are onboard the UAV. In another embodiment, the one or more computer processors are remotely located with respect to the UAV.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

Figure 1:
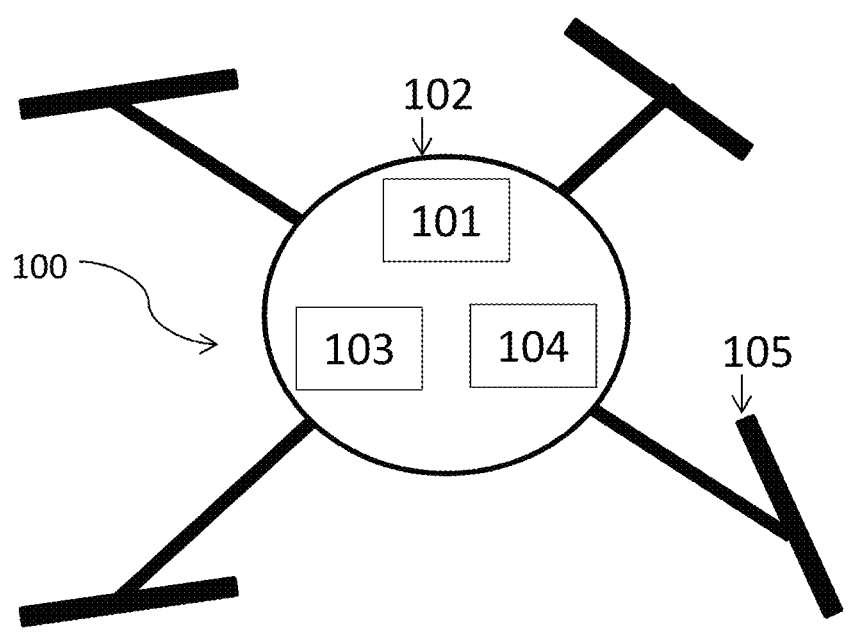
FIG. 1 is a schematic of an unmanned aerial vehicle (UAV)

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "unmanned aerial vehicle," as used herein, generally refers to a vehicle that is configured to operate without substantial or any involvement from an on-board operator (e.g., a pilot or driver). A UAV can operate autonomously or semi-autonomously. A UAV can be an aircraft that is configured to automatically take off and land on a surface. In some cases, a UAV can automatically travel from one location to another withy any operator involvement.

The term "reliable," as used herein, generally refers to a program that has a low probability of failing. A low probability of failure can be less than or equal to about 50%, 40%, 30%, 20%, 10%, 5%, 1%, 0.1%, 0.05%, 0.01%, 0.005%, or 0.001%. The program can receive and/or process data with high accuracy. The program can be robust. The program can be tested prior to use to ensure that the program is free of bugs. The reliable program can be tested and validated to meet a predetermined standard, such as a high reliability standard (e.g., program having a low probability of failure).

The term "unreliable," as used herein, generally refers to a program that has a high probability of failure. A high probability of failure can be at least about 1%, 5%, 10%, 15%, 20%, 25%, 30%, 40%, 50%, or 99%. The program can receive and/or process data with low accuracy. The program can be prone to crashing. The program can be prone to losing communication with one or more sensors. The unreliable program can be subjected to minimal or no testing prior to execution. The unreliable program can have bugs that can cause the program to crash or provide erroneous information. The unreliable program can be provided by a 3$^{rd}$ party that does not adhere to predetermined product testing standards.

The term "program," as used herein, generally refers to a computer program. A computer program can include a sequence of instructions that may be written to perform a specified task upon execution by one or more computer processors.

The term "virtual," as used herein, generally refers to a virtual machine that is an emulation of a particular computer system. A virtual machine can operate based on the computer architecture and functions of a real or hypothetical computer. A virtual machine can implement the functionality of a targeted real machine. Virtual machine may be system virtual machines or process virtual machines. System virtual machines can provide a substitute for the targeted real machine and a level of functionality required for the execution of a complete operating system. Process virtual machines can be programmed to execute a single computer program by providing a platform-independent program execution environment. The virtual machine can execute one or more programs in an isolated environment such that the behavior of one program does not influence another program. The virtual machine can isolate one or more programs from each other such that when one program crashes and/or consumes computational resources the other programs are not affected.

Provided herein are systems and methods for controlling an unmanned aerial vehicle (UAV) with a system of reliable and unreliable programs. The system can comprise one or more reliable programs and one or more unreliable programs. Data transfer can occur between the reliable and unreliable programs. The data can be provided to a control system to control one or more operations or the UAV. The system can be configured such that failure of one or more unreliable programs does not influence operation of the one or more reliable programs and/or unreliable programs that have not failed. A recovery action can be initiated when one or more of the unreliable programs fail. A recovery action can be initiated when the UAV is low on energy storage, when one or more sensors fail, and/or when a system component overheats. The systems and methods described herein can be applied to any computing structures wherein a reliable and an unreliable program are being executed consecutively and/or concurrently. In some cases, the reliable and the unreliable programs can be in communication. In some cases, the reliable or the unreliable program can execute one or more tasks in response to a signal provided by the unreliable or the reliable program, respectively.

A UAV can travel through a variety of environments. The UAV can travel in indoor, outdoor, and/or mixed indoor and outdoor environments. In some cases, a UAV can be configured to conduct surveillance, security, delivery, monitoring, or other tasks that can comprise combining movement and data collection. The UAV can travel over surface on which the UAV cannot safely land (e.g., water). In some cases a UAV can travel a far distance from a starting point. The distance can be far enough that the UAV cannot return to a starting point without refueling or recharging at an intermediate location. A UAV can be configured to land on a landing pad. A UAV can be configured to charge at a charging station. A landing pad can comprise a charging station.

FIG. 1 shows a schematic of an embodiment of a UAV 100. The UAV can comprise a plurality of sensors 101. The plurality of sensors can be housed in a body 102 of the UAV. In some cases the sensors can be off-board sensors that are in communication with the UAV through a wired or wireless connection. The sensors can be configured to collect and transmit data to a memory storage device on-board or off-board the UAV. The UAV can comprise vision sensors, audio sensors, olfactory sensors, and/or tactile sensors. The UAV can comprise locating sensors (e.g. global positioning sensors (GPS), inertial sensors, and/or accelerometers). The UAV can comprise infrared sensors, cameras, radar sensors, laser distance sensors, temperature sensors, moisture sensors, pressure sensors, and/or air speed sensors. The UAV can comprise one or more inertial measurement units (IMU). The IMU can comprise a group of sensors including one or more magnetometers, gyroscopes, and/or accelerometers.

The UAV 100 can further comprise one or more processors 103. The one or more processors can be on-board the UAV. The processors can be in communication with one or more memory storage devices. In some cases the one or more processors can be programmed to execute one or more programs. The one or more programs can interpret, process, and/or transmit data from the one or more sensors 101.

The UAV 100 can further comprise an energy storage device. The energy storage device can be a battery. The energy storage device can provide power to one of more systems on-board the UAV. For example, the energy storage device can provide power to one or more propulsion units 105 of the UAV. The energy storage device can provide power to one or more sensors on-board the UAV. The energy storage device can provide power to one or more computer systems on-board the UAV. In some cases the energy storage device can be a fuel tank. In some embodiments the energy storage device can be a rechargeable battery.

A UAV can be a vehicle that is configured to operate without an on-board operator (e.g. a pilot or driver). In some cases, the UAV can receive operating instructions from a remote control. Alternatively, the UAV can operate substantially autonomously without receiving instructions from a user through a remote control or other off-board communication unit. Operation of the UAV can include movement of the UAV, collection of data with one or more sensors on-board the UAV, transmission of data from one or more sensors, and/or processing of data. Movement of the UAV can include take off, landing, flight, and/or locomotion along a surface (e.g. the ground). The UAV can be a ground, water, or aerial vehicle. In the case of an aerial vehicle the UAV can be a fixed wing aerial vehicle. Alternatively, the UAV can be a helicopter aerial vehicle comprising one or more rotors. The rotors can provide propulsion and/or lift to the UAV. The UAV can have at least 1, 2, 3, 4, 5, 6, 7, 8, 9, or 10 rotors. In some cases, the UAV can be configured to carry a cargo. The UAV can have a maximum dimension of at most about 500 meters (m), 400 m, 300 m, 200 m, 100 m, 50 m, 30 m, 25 m, 20 m, 15 m, 10 m, 5 m, 4 m, 3 m, 2 m, 1 m, 50 centimeter (cm), 40 cm, 30 cm, 20 cm, 10 cm, 1 cm, 50 millimeters (mm), 10 mm or 1 mm. The UAV can weigh of at least about 1 gram (g), 10 g, 100 g, 500 g, 1 kilogram (kg), 2 kg, 3 kg, 4 kg, 5 kg, 10 kg, 20 kg, 30 kg, 40 kg, 50 kg, 100 kg, 250 kg, 500 kg, 1000 kg, 2000 kg, 3000 kg, 4000 kg, or 5000 kg. In some instances the UAV can weigh less than 1 kg, 500 g, 400 g, 300 g, 200 g, 100 g, 50 g, 40 g, 30 g, 20 g, 10 g, or 1 g.

The UAV can be configured to land on a landing pad. The UAV can land and take off from the landing pad autonomously or semi-autonomously. In an autonomous landing or take off, the UAV can receive flight instructions from one or more processors that can be on-board or off-board the UAV. In a semi-autonomous takeoff or landing, the UAV can receive at least a portion of a flight instruction from a user through a remote control or another device in communication with the UAV. The landing pad can be configured such the landing pad permits autonomous or semi-autonomous takeoff and/or landing of the UAV from or on the landing pad, respectively.

Figure 2:
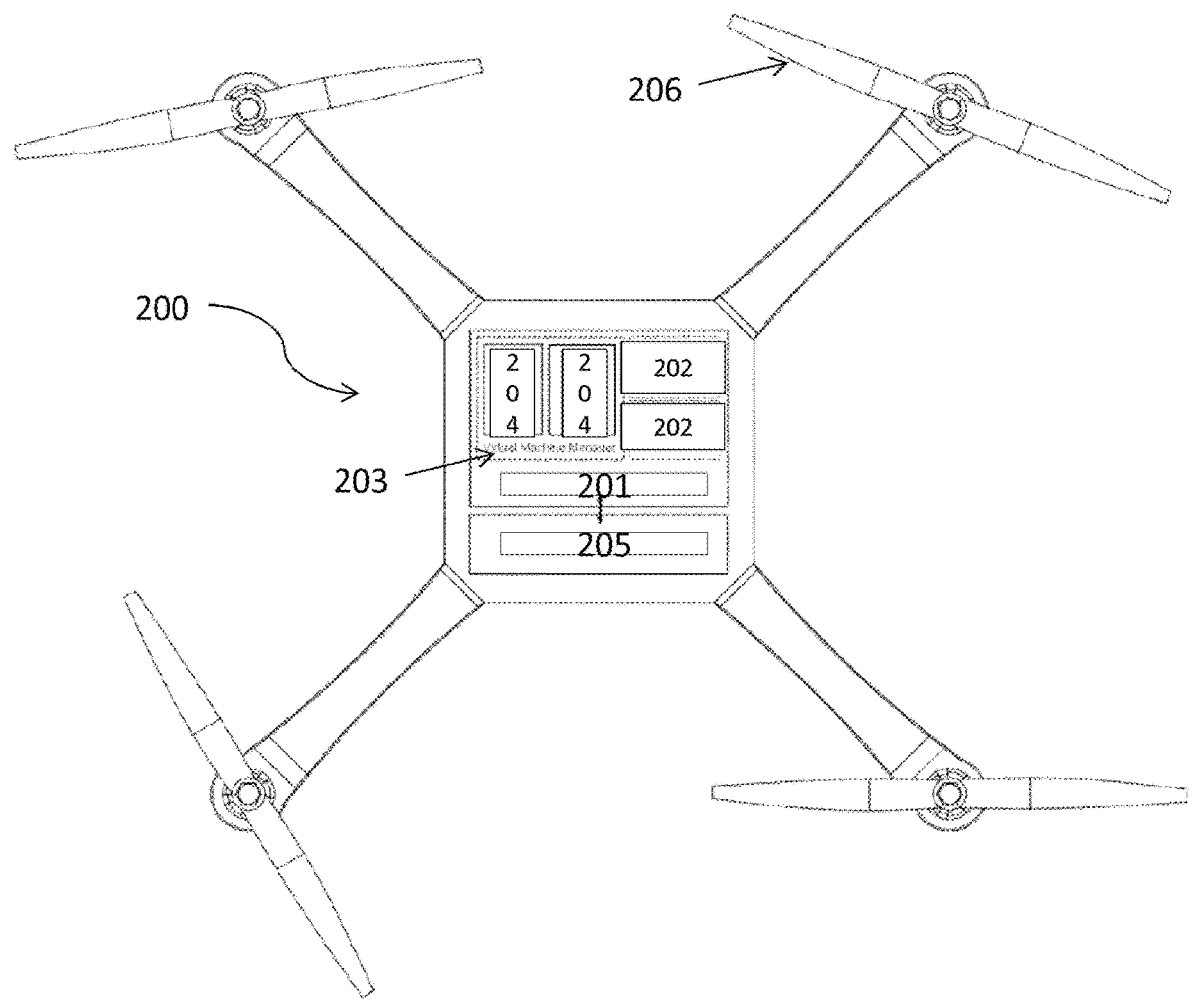
FIG. 2 is a schematic of a computer system on-board a UAV.

FIG. 2 shows a UAV 200 comprising one or more computer systems. The UAV can comprise an application computer 201. The application computer can comprise one or more computer processors configured to execute one or more programs, which can facilitate the operation of the UAV, including navigation and data collection. The application computer can execute one or more first programs and one or more second programs. In some cases one or more of the second programs executed by the application computer can be essential to operation of the UAV. The one or more second programs can be communication programs and/or navigational programs. Alternatively one or more of the first programs executed by the application computer can be trivial or less critical to operation of the UAV. The one or more first programs can be high level flight coordination programs, sensor processing programs, data logging programs, and/or other application specific software. The computer system can operate in a safe and reliable manner even in the event of failure of one or more first programs. In some examples, the one or more second programs are more reliable than the one or more first programs upon execution by a computer processor.

The one or more programs executed by the application computer that are essential to operation of the UAV can be more reliable than the one or more programs that are non-essential to operation of the UAV. The application computer can execute the one or more second programs 202 in a host environment. The application computer can execute a virtual machine manager 203 residing in memory. The virtual machine manager can monitor one or more programs 204 executing on a virtual machine. The one or more first programs can be executed on the virtual machine. In some embodiments one or more of the first programs and one or more of the second programs can be executed on the virtual machine. Programs executing on the virtual machine can communicate and exchange data with one or more programs running on the host environment. The virtual machine can segregate the one or more first programs from the one or more second programs executed in the host environment such that when one or more of the first programs fails the one or more second programs are unaffected.

The application computer 201 can communicate through a wired or wireless connection to a flight controller 205. In some embodiments, the application computer can communicate with the flight controller over an Ethernet connection. The flight controller can comprise one or more processors and one or more memory storage devices. The flight controller can receive and carry out flight instructions. The flight controller can be in communication with one or more propulsion units 206 on-board the UAV. The flight controller can be in communication with one or more navigation controls on board the UAV.

One or more computer processors can be programmed to execute a first program and a second program in memory on-board a UAV. The first program can communicate with the second program. Data can be transferred bidirectional between the first program and the second program. The second program can be more reliable than the first program. In some cases, the second program can be executed in a host environment and the first program can be executed in a virtual client environment. Alternatively, both the first program and the second program can be executed in a virtual client environment. The first program and the second program can communicate with a hierarchical structure such that the second program can have more control over one or more functions of the UAV compared to the first program. The second program can maintain highest level of control over one or more functions of the UAV. The second program can receive and follow instructions transmitted from the first program upon execution. In some cases, the second program can receive and disregard instructions transmitted from the first program upon execution.

Upon execution the first program can collect sensor data from one or more sensors on-board the UAV. In some cases, the first program can additionally collect data from one or more sensors off-board the UAV. The first program can collect raw sensor data from the one or more sensors. The first program can collect sensor data that is at least partially processed from the one or more sensors. In some cases the first program can process the raw or partially processed sensor data.

One or more of the first programs can be written and/or developed by a third party that does not manufacture either or both of the UAV and the second program. The first program can be executed without testing in a controlled environment. The first program can be executed without testing in a flight simulation. The first program can be executed without in-flight testing. The first program can be executed in a different operating system than the second program.

Upon execution the second program can collect sensor data from one or more sensors on-board the UAV. In some cases, the second program can additionally collect data from one or more sensors off-board the UAV. The second program can collect raw sensor data from the one or more sensors. The second program can collect sensor data that is at least partially processed from the one or more sensors. In some cases the second program can process the raw or partially processed sensor data.

The first program can transmit at least a fraction of the sensor data to the second program. The second program can be more reliable than the first program. The second program can further process the sensor data. In some cases, the second program can combine data transmitted from the first program and data collected from one or more sensors in communication with the second program. In some embodiments, the first program can transmit at least a fraction of the sensor data to a system-off board the UAV. The first computer program can transmit at least a fraction of the sensor data to a system-off board the UAV through a wired or wireless connection. The one or more computer processors can be further configured to continuously or discretely monitor the sensor data transmitted from the first program to the second program. The one or more computer processors can determine the accuracy of the data transmitted from the first program to the second program.

The determination of the accuracy of the data transmitted from the first program to the second program can be based on prior data, a calculation performed by a mathematical model (or algorithm) executed on a computer processor, data from another sensor in communication with the first program, data from another sensor in communication with the second program, one or more predetermined parameters, data trends, and/or relationship to a predetermined threshold value. For example, a predetermined safe zone can be provided. If the first program commands the UAV to exit the predetermined safe zone the second program can override the instruction to prevent the UAV from exiting the safe zone. The accuracy of the data transmitted from the first program can be considered over a fixed time interval (e.g., 1 millisecond). A series of data points can be averaged over the fixed time interval. The accuracy of the time averaged data transmitted from the first program can determine the accuracy of the data transmitted by the first program. The fixed time interval can be chosen such that the signal to noise ratio in the data accuracy is minimized. The fixed time interval can be at least about 1 microsecond, 10 microseconds, 100 microseconds, 500 microseconds, 1 millisecond, 10 milliseconds, 100 milliseconds, 500 milliseconds, 1 second, 15 seconds, 30 seconds, 1 minute, 5 minutes 10 minutes, 30 minutes, 1 hour, 2 hours, 3 hours, 4 hours, 5 hours, 6 hours, 12 hours, or 1 day. The fixed time interval can be the same for data from any sensor measurement communicated from the first program. Alternatively, the time interval can vary for one or more sensors measurements communicated from the first program. In some instances, the second program can have a timer that monitors the amount of time that passes after the second program receives one or more data points from the first program. When the first program does not provide one or more data points for a predetermined duration of time the second program can stop accepting data from the first program.

The one or more computer processors can be further programmed to initiate a recovery action when the first program fails. Failure of the first program can occur when one or more sensor measurements transmitted by the first program fall below a threshold accuracy for a given time interval. The threshold accuracy can be 100%, 95%, 90%, 85%, 80%, 75%, 70%, 65%, 60%, 55%, or 50%. Failure of the first program can occur when the first program crashes. Failure of the first program can occur when the first program does not transmit one or more sensor measurements to the second program within a predetermined time interval. Failure of the first program can occur when the first program is unresponsive to a request or instruction transmitted by the second program.

Recovery actions can also be initiated by detecting irregularities in the communications between the first program and the second program. For example, in one embodiment, the first program can be implemented with a higher level computing system, such as an X86 or any other suitable architecture capable of running a high level operating system and a virtual machine; the second program can be implemented with a lower level computing system, such as a low level microprocessor designed for embedded programming. In this embodiment, the first program can periodically generate a safe flight path ("failsafe plan") that allows the UAV to return to safety based on the current state of the UAV and other various data it receives and processes as discussed above. This failsafe plan can be a safe flight path constructed with rigorous safety considerations including smooth control, obstacle avoidance, and safety and keepout zones, and the failsafe plan can be sent to the second program to be stored. During the normal operation, the communication between the first program and the second program can be characterized as having a predetermined regularity, such as sending individual packets as heartbeats at a certain frequency. If, for example, the first program sends a packet at 50 Hz and the second program does not receive the packet for half a second, it can be determined that a recovery action should be initiated and that the failsafe plan should be executed. In other instances, a recovery action can be initiated when a virtual machine running on the first program system crashes.

In another embodiment, a microprocessor designed for embedded programming can be considered as a higher level computer system that constitutes the first program, and a lower level computer system, such as a controller dedicated to a few specific operations of the UAV, can be considered as a second program implemented with a lower level computer system. An example second program in this embodiment can be a motor controller that is highly reliable and tasked with a dedicated function of controlling motors. In this example, the first program, which is in charge of higher functionalities, can determine the throttle of the propellers appropriate for a maneuver (e.g., hovering), and the second program can be directly responsible for running the motors at a certain speed. The first program can determine that a "failsafe plan" in this instance is to have the throttle slightly below the level that allows the UAV to hover so that the UAV would stay level and slowly descend to the ground. This failsafe plan can be sent from the first program to the second program to be stored. Similar to the example discussed above, when the communication between the first and the second programs exhibit irregularities, such as not receiving a packet (heartbeat), a recovery plan can be initiated and the failsafe plan of slow and level descent, for example, can be executed in this embodiment.

A recovery action can be task or a flight response performed by the UAV. The recovery action can cause the UAV to travel to a safe location. The recovery action can be performed without sensor data from one or more sensors in communication with the first program. The recovery action can be stored in a memory storage device that is on-board or off-board the UAV. In some cases, the recovery action can comprise one or more instructions in memory to land the UAV. The recovery action can comprise one or more instructions in memory to return the UAV to a given location. The one or more instructions can be programmed in memory and can include a flight plan, including a trajectory, to return the UAV to the given location. The given location can comprise a location where the UAV began its flight, a nearest landing station, a nearest charging station, a closest or nearby safe landing area, and/or a surface where the UAV can land without damage.

One or more computer processors on-board the UAV can be configured to receive instructions describing the recovery action of the UAV at discrete time intervals. One or more computer processors can be programmed to generate instructions describing the recovery action based on UAV state and location parameter(s) corresponding to the UAV in real time. The one or more computer processors that can be programmed to generate instructions describing the recovery action can be the one or more computer processors on-board the UAV or they can be an additional one or more computer processors off-board the UAV. The one or more computer processors off-board the UAV can be in communication with the UAV through a wireless or wired connection.

The one or more computer processors, on-board or off-board the UAV, can be programmed to generate instructions describing the recovery action autonomously or semi-autonomously. The one or more computer processors, on-board or off-board the UAV, can be programmed to generate instructions describing the recovery action without input from a human operator. The one or more computer processors can generate the recovery action at discrete time intervals. For example, the one or more computer processors can generate the recovery action at least about every 1 second, 15 seconds, 30 seconds, 1 minute, 5 minutes 10 minutes, 30 minutes, 1 hour, 2 hours, 3 hours, 4 hours, 5 hours, 6 hours, 12 hours, or 1 day. The one or more computer processors can generate the recovery action and continuously update the recovery action based on parameters associated with the state and current location of the UAV. The recovery action can be stored in a reliable computer system on-board the UAV such that the UAV can execute the recovery action when a less reliable computer system fails. The UAV can execute the recovery action without input and/or functionality associated with the less reliable computer system. In some instances, the first program can continuously provide the second program with a recovery action. The second program can store the recovery action in memory for future use. If the first program fails, then the second program can initiate a recovery action based on the most recent reliable recovery action that was previously provided by the first program. The second program can initiate and perform the recovery action without input or functionality from the first program.

The instructions describing the recovery action can be based on a state parameter of the UAV. The state parameter of the UAV can comprise current charge remaining on a battery of the UAV, temperature of one or more components on-board the UAV, age of the UAV, and/or health of one or more systems on-board the UAV. The one or more computer processors programmed to generate instructions describing the recovery action can be in wired or wireless communication with one or more sensors on-board the UAV configured to monitor one or more state parameters of the UAV.

The instructions describing the recovery action can be based on an instantaneous location of the UAV. The instantaneous location of the UAV can comprise parameters such as distance between a current location of the UAV and a starting point of the UAV, distance between a current location of the UAV and a nearest landing area of the UAV, and/or distance between a current location of the UAV and a nearest charging station of the UAV. The one or more computer processors programmed to generate instructions describing the recovery action can be in wired or wireless communication with one or more sensors on-board the UAV configured to monitor one or more location parameters of the UAV. Additionally, the one or more computer processors can be in communication with one or more memory storage devices that are configured to provide the location of safe landing areas, charging stations, and/or landing stations.

The instructions describing the recovery action can be based on an environmental parameter associated with a current location of the UAV. The environmental parameter associated with a current location of the UAV can comprise wind speed, precipitation, humidity, temperature, and/or forecasted weather conditions. The one or more computer processors programmed to generate instructions describing the recovery action can be in wired or wireless communication with one or more sensors on-board the UAV configured to monitor one or more environmental parameters in a space surrounding the UAV. Additionally, the one or more computer processors can be in communication with weather sensors off-board the UAV (e.g. weather station sensors). In some cases, the one or more processors can receive environmental parameters and/or weather forecasts through a wired or wireless internet connection.

Figure 3:
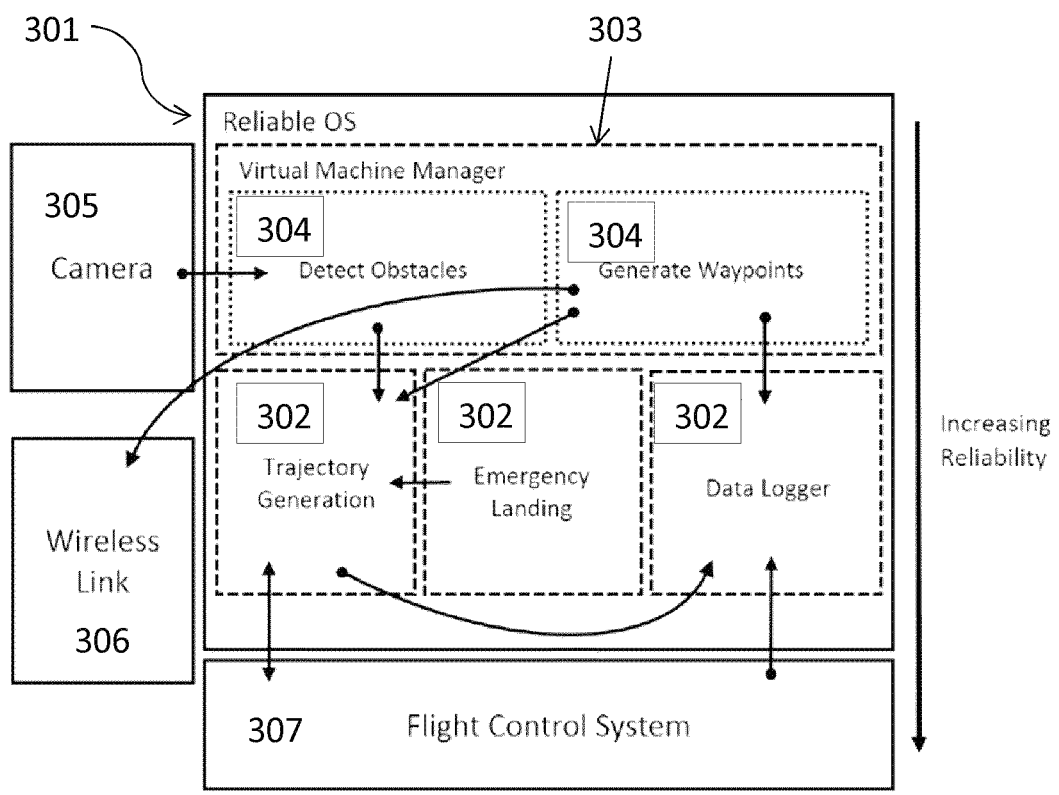
FIG. 3 is flow chart of communication pathways in a computer system.

FIG. 3 shows a flow chart that describes communication paths that can occur between programs and components in the system. A computer system 301 can have on one or more second programs 302 executing in a host environment. The one or more second programs 302 can be used to operate a machine monitor, operate communication, perform high level navigation, facilitate emergency landing, and generate a trajectory (or path) of the UAV. The computer system 301 can execute a virtual machine manager 303 to generate and manage a virtual environment to execute one or more first programs 304. The one or more first programs 304 can be used to detect obstacles, generate waypoints (or way points), log data, process sensor data, and perform other non-critical applications. The one or more first programs 304 can be less reliable than the one or more second programs 302. One or more of the first programs can communicate with a sensor 305 on-board or off-board the UAV. In an example, the sensor 305 can be a vision sensor such as a camera. The one or more first programs in communication with the sensor can transmit the sensor data the one or more second programs. In some cases, the first program can communicate with the second program through a wireless link 306. The data can be at least partially processed by the one or more first programs prior to transmission to the one or more second programs. The second program can further process the sensor data. The second program can combine sensor data from one or more of the first programs. In some cases, the second program can transmit the sensor data to one or more other second programs. One or more of the second programs can generate and/or transmit data to another of the one or more second programs. One or more of the second programs can transmit data to a flight control system 307. The flight control system can initiate a flight response in accordance with the transmitted data from the one or more second programs. The second program can assess the reliability of the data prior to transmitting the data to the flight control system.

Also provided herein is a method for providing a reliable control system on-board a UAV. The method can comprise executing with one or more computer processors a first program and a second program in memory on board the UAV. Upon execution, the first program can collect sensor data directly or indirectly from one or more sensors of the UAV. One or more of the sensors can be on-board the UAV. One or more of the sensors can be off-board and in communication with the UAV. The method can additionally comprise transmitting the sensor data from the first program to the second program. The method can further comprise, monitoring the sensor data transmitted from the first program to a second program to determine a level of accuracy of the sensor data transmitted from the first program to the second program with respect to the sensor data collected from the one or more sensors of the UAV and initiating a recovery action by the UAV if the level of accuracy falls below a threshold accuracy over a given time interval. The threshold accuracy can be less than or equal to about 100%, 95%, 90%, 85%, 80%, 75%, 70%, 65%, 60%, 55%, or 50%. In some examples, the level of accuracy is determined by comparing the sensor data transmitted from the first program to the second program to sensor data collected by the one or more sensors. For example, a first program can determine an accurate location using a vision sensor such as a camera. The location determined from the camera can be accurate but sometimes unreliable. In some cases, the image captured by the vision sensor can be obscured by light reflection and the location determined from the image can be unreliable. The second program can be in communication with a GPS sensor. The GPS sensor can be reliable but may provide a less accurate location than the vision sensor. In some instances, the location determined by the GPS sensor and the vision sensor can be compared and the location determined by the vision sensor can be rejected if it is determined to be too far outside of the location determined by the GPS sensor. In some instances a variance can be calculated for data generated or transferred by the first and/or second programs. For example, GPS, can give an estimate of variance (e.g. based on the signal strength and number of satellites). In some cases, variance can be calculated for camera measurement (e.g. by computing re-projection error and applying one or more heuristics). A Kalman filter can determine variance in sensor fusion. If the variance of one or more data points increases above a predetermined threshold the data can be rejected and a recovery action can be initiated.

Figure 4:
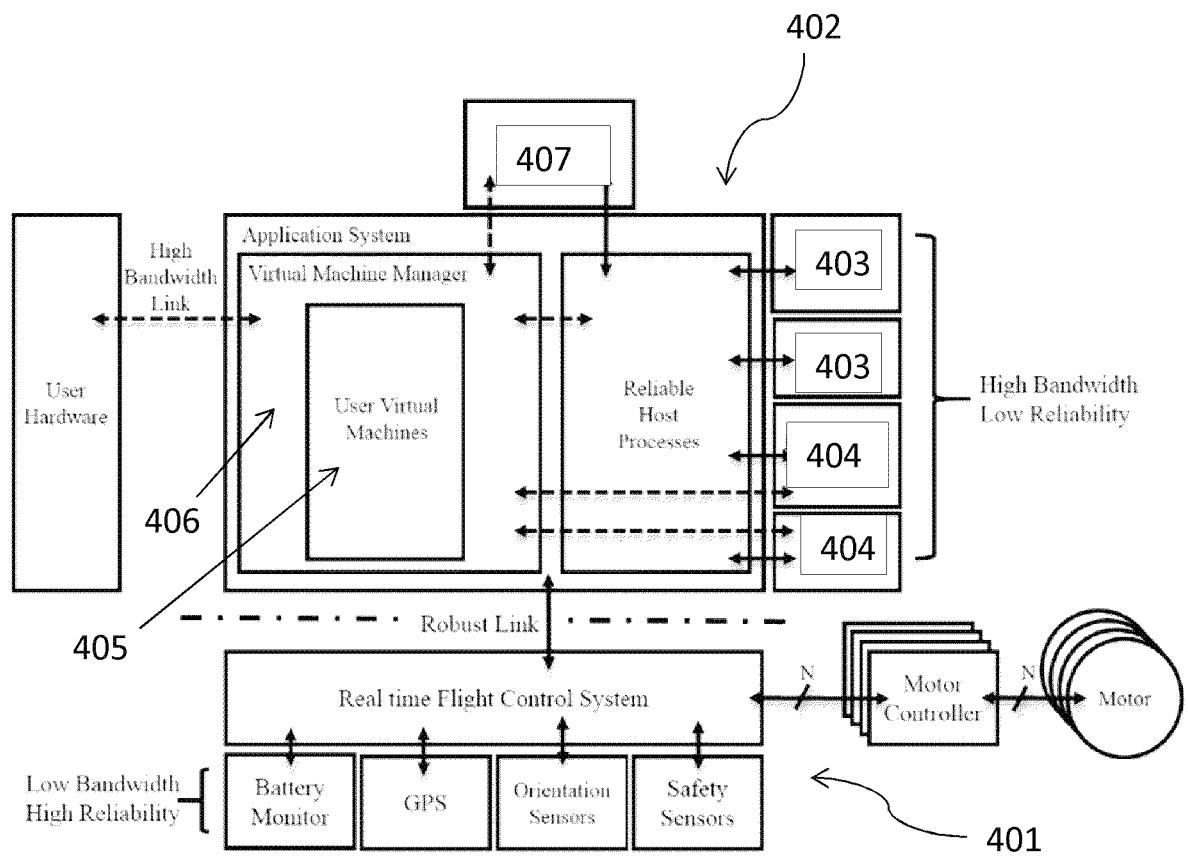
FIG. 4 is a detailed flow chart of an embodiment of a computer system and communication between elements in the computer system.

FIG. 4 shows a schematic representation of a system and method for providing a reliable control system on-board a UAV. The system described in FIG. 4 comprises a control system 401. The control system can be a flight control system. The control system can be a movement control system. The control system can be a flight control system configured to provide flight instructions to one or more systems on a UAV. The control system 401 can be in communication with a host system 402. The communication can be wired or wireless communication. The host system 402 can be a computer system. The control system 401 can be in communication with the host system 402 through a wired or wireless connection. In some embodiments the control system can be in communication with the host system through an Ethernet connection.

The host system 402 can comprise one or more sensors, for example vision sensors 403, memory storage (e.g., random-access memory, read-only memory, flash memory, or solid state storage (SSD)), and one or more wireless peripherals 404. The host system can execute a virtual machine manager 405 to manage one or more virtual machines 406. One or more programs can be executed on the virtual machines. The programs executing on the virtual machines can collect and/or interpret data from the one or more sensors 403. In an example waypoint generator program and a status update task program can be executed on the virtual machines. The waypoint generator can determine a waypoint using data from one or more sensors. A waypoint can comprise a set of coordinates that identify a point or set of points in physical space. In some cases the waypoint generator can receive data from one or more programs executing on the host system, for example an inertial measurement unit (IMU) interface. Programs executing on the host system can be more reliable than programs executing on the virtual machines. The waypoint generator can be less reliable than a waypoint follow program. The waypoints generated by the waypoint generator can be transmitted to the waypoint follow program that is executed on the host system.

If one or more programs running on the virtual machines fail to transmit data or transmit faulty data to a more reliable program that can be executed on the virtual machine or in the host environment, the more reliable program can execute a back-up reliable program to compensate for the data that was not transmitted. The reliable program is isolated from the one or more unreliable programs such that failure of the unreliable programs does not influence operation of the reliable program.

Additionally, the unreliable programs are running on isolated virtual machines such that a first unreliable program is separated from a second unreliable program. If a first unreliable program fails a second unreliable program can continue to execute without being effected.

The principles described above can be implemented across multiple levels of hardware and software illustrated in FIGS. 3 and 4. For example, a UAV may be used to photograph or measure an environmental characteristic of a region. To accomplish this, the UAV will have one or more attached sensors such as a camera or infrared sensor (e.g. the user hardware of FIG. 4), and may be programmed with a "mission flight plan" over the region of interest during which it will gather data. The mission flight plan may be programmed into the host system 402 (e.g. an X86 processor and memory) and executed as part of the reliable host processes, for example as part of or interfacing with the trajectory generation module 302 of FIG. 3. In normal operation, trajectories from the host system 402 based on the programmed mission flight plan are forwarded to the flight control system (307 in FIGS. 3 and 401 in FIG. 4) to control UAV flight during execution of the mission flight path. The flight control system may include its own processor and memory, which may be in the form of a microcontroller of simpler architecture than the host system 402. From these trajectories and from sensor data such as IMU and GPS data, the flight control system 401 computes motor control commands. These motor control commands are received by the motor controllers, which may include their own processors and memory as well, of even simpler architecture than the processors of the flight control system, which translates them into drive currents for the propeller motors, thereby controlling the position, velocity, and acceleration of the UAV as necessary to execute the mission flight plan. Sensor control and data gathering functions performed during execution of the mission flight plan may be handled by software running in a virtual machine 405.

As the mission flight plan is executed, one or more "recovery flight plans" may be generated by the host system 402. These may alternatively be referred to as failsafe plans herein. Typically, such a recovery flight plan corresponds to a series of trajectories and/or waypoints that define a flight to a known safe location, which may be, for example, a flight back to the base from which the mission began. The flight control system 401 may store such a recovery flight plan. It will be appreciated that as the mission flight plan is executed, an existing stored recovery flight plan may become unsuitable, because as the UAV moves while performing the mission flight plan, physical obstacles may become interfering, or the existing recovery flight plan may cross a defined no-fly area. To take this into account, as described above, recovery flight plans that take into account the current location and state of the UAV may be periodically generated or generated in response to the UAV location or state, and these updated recovery flight plans may be sent to and stored in the flight control system 401. Therefore, at least during a majority of the time during mission performance, and preferably at all times during mission performance, a suitable recovery flight plan may be stored in the flight control system 401.

As one form of recovery, it may occur that the user hardware or data gathering software in a user virtual machine fails. Operation of these items may be monitored by the host system 402, and if such a failure is detected, there is no reason to continue the mission flight plan. In this case, the host system 402 may begin sending trajectory commands to the flight control system 401 that correspond to the recovery flight path rather than the mission flight path. If mission flight plan trajectory commands have been pre-sent to the flight control system 401, the host system 402 may replace those with trajectory commands corresponding to the recovery flight plan. As noted above, in some implementations, the flight control system 401 already has a current valid recovery flight plan stored therein (received and updated by the host system as described above). In these implementations, the host system may, in response to user hardware/software or virtual machine failure, send a command to the flight control system to abort the mission flight plan, and begin executing the stored recovery flight plan.

To obtain another level of recovery capability, the flight control system may execute trajectory commands associated with the mission flight plan, unless either the host system instructs the flight control system to switch to the recovery flight plan as described above, or the flight control system 401 detects a failure of the host system 402. Such a failure may be detected by a loss of regular communication from the host system 402, as described above. If such a problem is detected, the fight control system 401 can execute the stored recovery flight plan trajectories even though the host system 402 is no longer sufficiently operational to communicate with the flight control system 401. The downloading of the latest recovery flight plan from the host system 402 to the flight control system 401 allows the flight control system 401 to execute a safe recovery flight in a safe manner. This can remain possible even in implementations where the flight recovery system by itself may haveno ability to detect obstacles or any knowledge of defined no-fly areas.

As yet another layer of recovery capability, the flight control system 401 can periodically pre-load one or more recovery motor control commands into each motor controller where they can be saved in the motor controllers for use in the event that the flight control system 401 fails. As described above, these motor control commands could cause the UAV to slowly descend vertically, or descend while travelling toward a particular direction, or the like. A failure in the flight control system 401 could be detected by the motor controllers in the same way that failure of the host system is determined by the flight control system, e.g. failure to receive commands from the flight control system for some period of time.

Computer Control Systems

Figure 5:
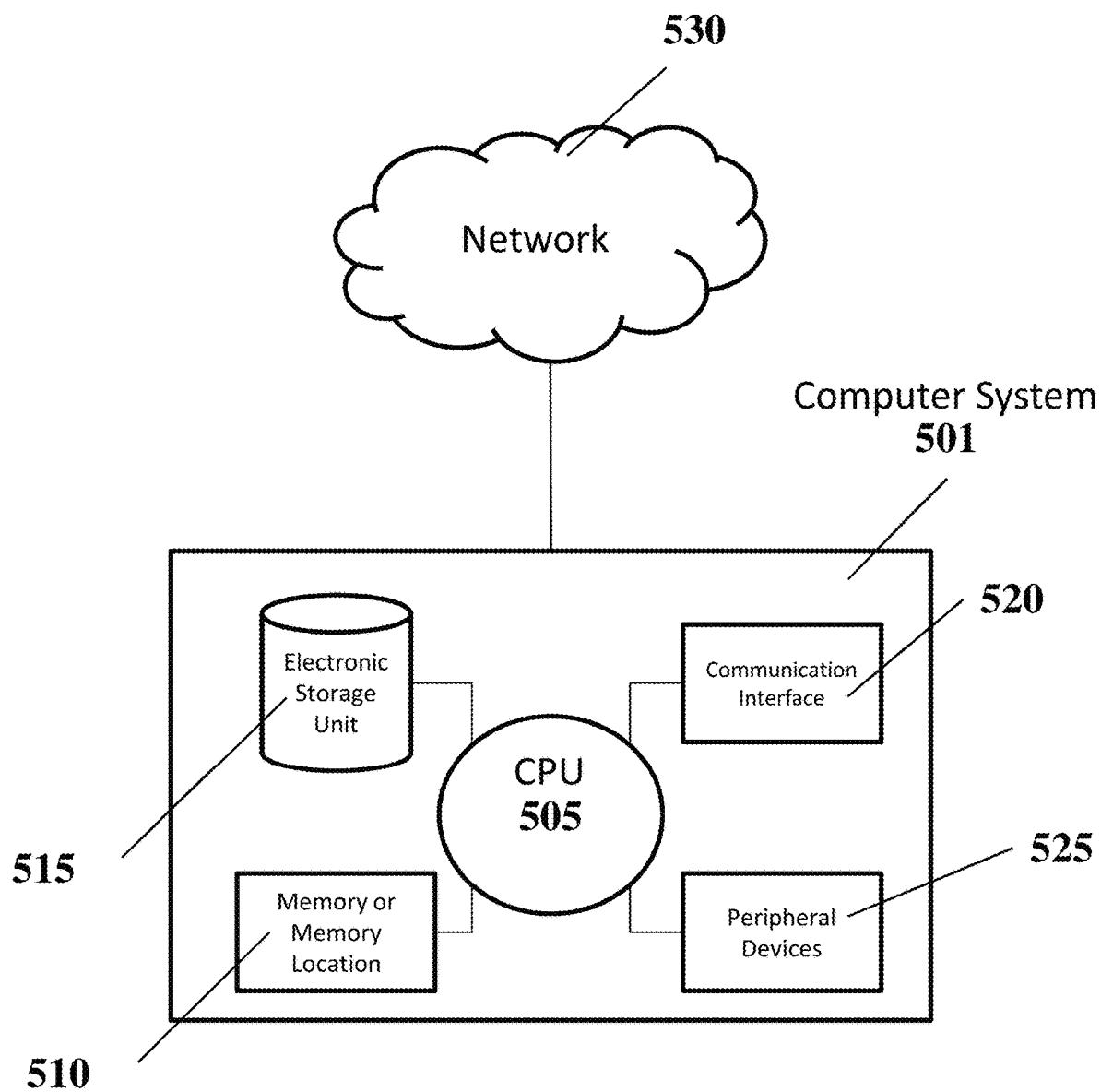
FIG. 5 shows a computer system that is programmed or otherwise configured to implement methods and systems of the present disclosure.

The present disclosure provides computer control systems that are programmed to implement methods of the disclosure. FIG. 5 shows a computer system 501 that is programmed or otherwise configured to provide reliable control of a UAV. The computer system 501 can execute reliable and unreliable programs. In some cases, the unreliable program can be executed in a virtual machine such that it is isolated from the reliable program. The computer system 501 can regulate various aspects of communication between different programs that are simultaneously executed on the computer system. The computer system 501 can isolate reliable and unreliable programs such that when an unreliable program crashes or fails the reliable program is able to initiate a recovery action to bring the UAV to a safe location.

The computer system 501 includes a central processing unit (CPU, also "processor" and "computer processor" herein) 505, which can be a single core or multi core processor, or a plurality of processors for parallel processing. The computer system 501 also includes memory or memory location 510 (e.g., random-access memory, read-only memory, flash memory), electronic storage unit 515 (e.g., hard disk), communication interface 520 (e.g., network adapter) for communicating with one or more other systems, and peripheral devices 525, such as cache, other memory, data storage and/or electronic display adapters. The memory 510, storage unit 515, interface 520 and peripheral devices 525 are in communication with the CPU 505 through a communication bus (solid lines), such as a motherboard. The storage unit 515 can be a data storage unit (or data repository) for storing data. The computer system 501 can be operatively coupled to a computer network ("network") 530 with the aid of the communication interface 520. The network 530 can be the Internet, an internet and/or extranet, or an intranet and/or extranet that is in communication with the Internet. The network 530 in some cases is a telecommunication and/or data network. The network 530 can include one or more computer servers, which can enable distributed computing, such as cloud computing. The network 530, in some cases with the aid of the computer system 501, can implement a peer-to-peer network, which may enable devices coupled to the computer system 501 to behave as a client or a server.

The CPU 505 can execute a sequence of machine-readable instructions, which can be embodied in a program or software. The instructions may be stored in a memory location, such as the memory 510. Examples of operations performed by the CPU 505 can include fetch, decode, execute, and writeback.

The CPU 505 can be part of a circuit, such as an integrated circuit. One or more other components of the system 501 can be included in the circuit. In some cases, the circuit is an application specific integrated circuit (ASIC).

The storage unit 515 can store files, such as drivers, libraries and saved programs. The storage unit 515 can store user data, e.g., user preferences and user programs. The computer system 501 in some cases can include one or more additional data storage units that are external to the computer system 501, such as located on a remote server that is in communication with the computer system 501 through an intranet or the Internet.

The computer system 501 can communicate with one or more remote computer systems through the network 530. For instance, the computer system 501 can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 501 via the network 530.

Methods as described herein can be implemented by way of machine (e.g., computer processor) executable code stored on an electronic storage location of the computer system 501, such as, for example, on the memory 510 or electronic storage unit 515. The machine executable or machine readable code can be provided in the form of software. During use, the code can be executed by the processor 505. In some cases, the code can be retrieved from the storage unit 515 and stored on the memory 510 for ready access by the processor 505. In some situations, the electronic storage unit 515 can be precluded, and machine-executable instructions are stored on memory 510.

The code can be pre-compiled and configured for use with a machine have a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 501, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 501 can include or be in communication with an electronic display that comprises a user interface (UI) for providing, for example, information to a user about the health of one or more systems on-board the UAV. The UI can provide information about the actions of an unreliable program. The UI can alert a user when an unreliable program has failed. When an unreliable program fails the UI can indicate the type of recovery action initiated by the UAV. Examples of UI's include, without limitation, a graphical user interface (GUI) and web-based user interface.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method of providing a reliable control system on-board an unmanned aerial vehicle (UAV), comprising:
    executing a first program on a first processor, the first processor configured to:
        collect sensor data from one or more sensors of the UAV, and
        transmit the sensor data from the first program to a second program;
    executing the second program on a second processor of a simpler architecture than the first processor, the second processor coupled to one or more subsystems of the UAV, the second program configured to:
        monitor the sensor data transmitted from the first program to the second program to determine a level of accuracy of the sensor data transmitted from the first program to the second program with respect to the sensor data collected from the one or more sensors of the UAV; and
    initiate a recovery action by the UAV if the level of accuracy falls below a threshold accuracy over a predetermined time interval.

2. The method of claim 1, further comprising receiving, by the second program on the second processor, instructions describing the recovery action of the UAV at discrete time intervals.

3. The method of claim 1, wherein the second program is more reliable than the first program.

4. The method of claim 1, wherein the recovery action includes one or more instructions to return the UAV to a given location.

5. The method of claim 1, wherein the recovery action includes one or more instructions to land the UAV.

6. The method of claim 1, wherein the recovery action includes one or more instructions to return the UAV to a closest or nearby safe landing area.

7. The method of claim 1, wherein the first program is executed by the first processor on a client virtual machine on a computer.

8. The method of claim 1, wherein the second program receives and follows instructions transmitted from the first program upon execution by the second processor.

9. The method of claim 1, wherein the second program receives and disregards instructions transmitted from the first program upon execution by the second processor.

10. The method of claim 1, further comprising generating instructions describing the recovery action based on one or more UAV state parameters and one or more location parameters corresponding to the UAV in real time.

11. The method of claim 10, wherein the one or more UAV state parameters include current charge remaining on a battery of the UAV.

12. The method of claim 10, wherein the one or more location parameters include a distance between a current location of a UAV and a starting point of the UAV.

13. The method of claim 10, wherein the one or more location parameters include a distance between a current location of a UAV and a nearest landing area of the UAV.

14. The method of claim 10, wherein the instructions are generated by one or computer processors off-board the UAV.

15. The method of claim 1, wherein the first processor and the second processor are onboard the UAV.

16. A system for providing reliable control of an unmanned aerial vehicle (UAV), comprising:
   one or more sensors onboard the UAV configured to provide sensor data;
   memory onboard the UAV configured to store the sensor data from the one or more sensors; and
   a first processor configured to execute a first program, the first program configured to:
      collect sensor data from the one or more sensors, and
      transmit the sensor data from the first program to a second program; and
   a second processor coupled to one or more subsystems of the UAV, the second processor having a simpler architecture than the first processor and configured to execute the second program, the second program configured to:
      monitor the sensor data transmitted from the first program to the second program to determine a level of accuracy of the sensor data transmitted from the first program to the second program with respect to the sensor data collected from the one or more sensors of the UAV; and
      initiate a recovery action by the UAV if the level of accuracy falls below a threshold accuracy over a pre-determined time interval.

17. The system of claim 16, wherein the second program is more reliable than the first program.

18. The system of claim 16, wherein the first processor is configured to execute the first program on a client virtual machine.

19. A non-transitory, computer-readable medium comprising machine executable code that implements a method of providing a reliable control system on-board an unmanned aerial vehicle (UAV), the method comprising:
   executing, by a first processor, a first program configured to:
      collect sensor data from one or more sensors of the UAV, and
      transmit the sensor data from the first program to a second program;
   executing the second program on a second processor having a simpler architecture than the first processor, the second processor coupled to one or more subsystems of the UAV, wherein the second program is configured to:
      monitor the sensor data transmitted from the first program to the second program to determine a level of accuracy of the sensor data transmitted from the first program to the second program with respect to the sensor data collected from the one or more sensors of the UAV; and
      initiate a recovery action by the UAV if the level of accuracy falls below a threshold accuracy over a pre-determined time interval.

* * * * *